(12) United States Patent
Dampier et al.

(10) Patent No.: US 7,962,535 B2
(45) Date of Patent: *Jun. 14, 2011

(54) REPORTING ON FACTS RELATIVE TO A SPECIFIED DIMENSIONAL COORDINATE CONSTRAINT

(75) Inventors: Todd O. Dampier, Mountain View, CA (US); Robert Todd Hunter, III, San Francisco, CA (US)

(73) Assignee: Merced Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,621

(22) Filed: Nov. 10, 2010

(65) Prior Publication Data

US 2011/0054971 A1 Mar. 3, 2011

Related U.S. Application Data

(63) Continuation of application No. 11/552,394, filed on Oct. 24, 2006, now Pat. No. 7,856,431.

(51) Int. Cl.
*G06F 12/00* (2006.01)
(52) U.S. Cl. ........................................ 707/957
(58) Field of Classification Search ........................ None
See application file for complete search history.

(56) References Cited

U.S. PATENT DOCUMENTS

| | | | |
|---|---|---|---|
| 6,161,103 A | 12/2000 | Rauer et al. | |
| 6,581,068 B1 | 6/2003 | Bensoussan et al. | |
| 7,013,290 B2 | 3/2006 | Ananian | |
| 7,177,854 B2 | 2/2007 | Chun et al. | |
| 7,366,730 B2 | 4/2008 | Greenfield et al. | |
| 2001/0049677 A1 | 12/2001 | Talib et al. | |
| 2002/0116362 A1 | 8/2002 | Li et al. | |
| 2002/0126545 A1* | 9/2002 | Warren et al. | 365/200 |
| 2003/0018634 A1 | 1/2003 | Shringeri et al. | |
| 2004/0024790 A1 | 2/2004 | Everett | |
| 2005/0120021 A1 | 6/2005 | Tang et al. | |
| 2006/0010113 A1 | 1/2006 | Berger et al. | |
| 2007/0027843 A1 | 2/2007 | Auerbach et al. | |
| 2007/0233651 A1* | 10/2007 | Deshpande et al. | 707/3 |

OTHER PUBLICATIONS

International Search Report in corresponding PCT application PCT/US2007/082104, mailed Jun. 11, 2008.
Written Opinion in corresponding PCT application PCT/US2007/082104, mailed Jun. 11, 2008.
Kimball, R., "The Data Warehouse Toolkit", 1996, John Wiley and Sons Inc., XP002482356, pp. 243-277.

* cited by examiner

*Primary Examiner* — Neveen Abel-Jalil
*Assistant Examiner* — Kellye D Buckingham
(74) *Attorney, Agent, or Firm* — Beyer Law Group LLP

(57) ABSTRACT

A received report query specifies a dimension coordinate constraint and an associated grain for the dimension coordinate constraint. At least one query is generated to the dimensionally-modeled fact collection. A result of providing the at least one query to the dimensionally-modeled fact collection is processed. The processed result includes an indication of every dimension coordinate satisfying the dimension coordinate constraint and having a particular value at the associated grain, and the processed result further includes facts of the dimensionally-modeled fact collection that are specified by at least one other dimension coordinate indicated by the processed result having the particular value at the associated grain and not satisfying the dimension coordinate constraint.

22 Claims, 3 Drawing Sheets

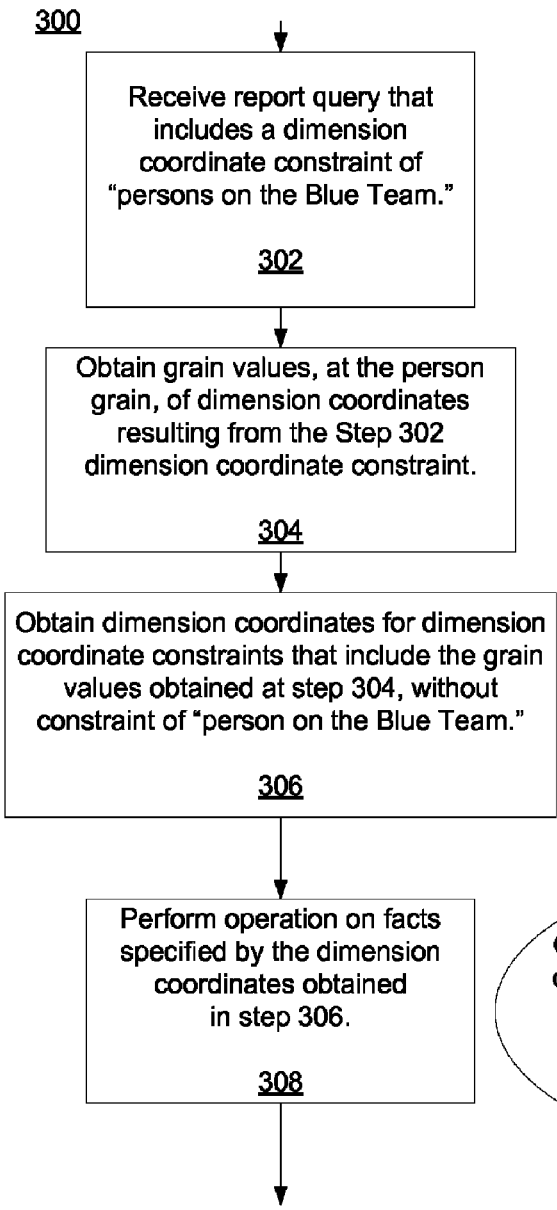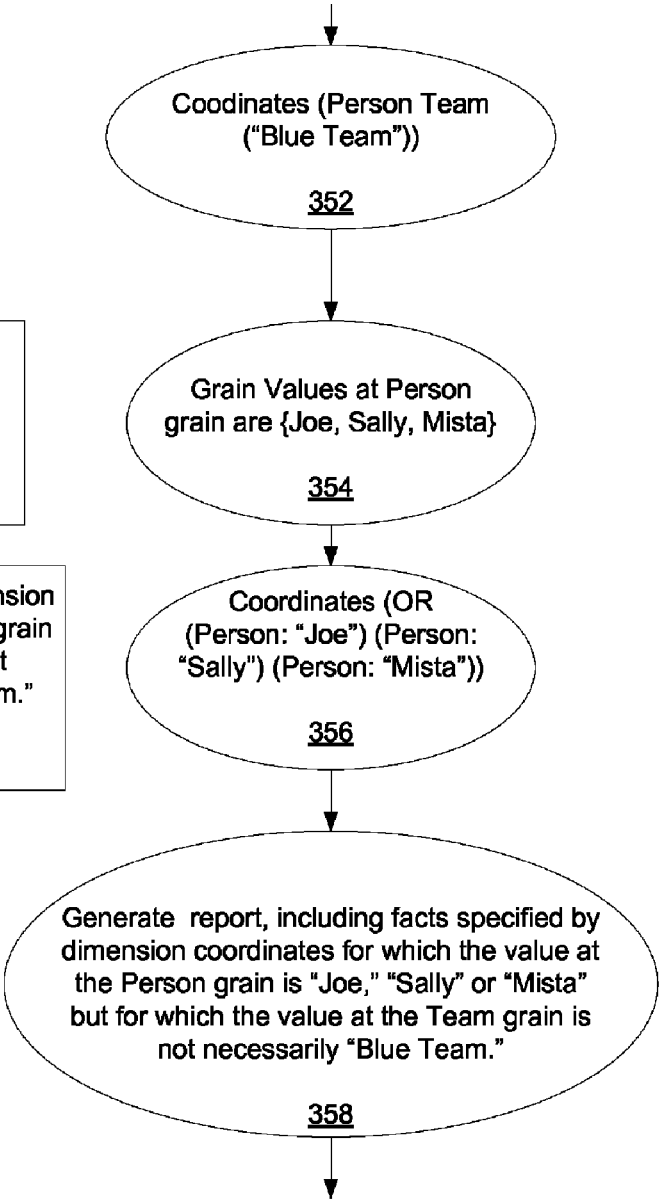
Fig. 3A
Fig. 3B

REPORTING ON FACTS RELATIVE TO A SPECIFIED DIMENSIONAL COORDINATE CONSTRAINT

CROSS-REFERENCE TO RELATED APPLICATIONS

This application is a continuation of prior, co-pending U.S. patent application Ser. No. 11/552,394, filed Oct. 24, 2006, which is incorporated herein by reference in its entirety for all purposes.

BACKGROUND

The present invention is in the field of reporting on facts of or derived from a collection of facts organized as, or otherwise accessible according to, a dimensional data model. For shorthand throughout this description, such a collection of facts is referred to as a dimensionally-modeled fact collection. In particular, the present invention relates to reporting on facts considering the phenomena in which a specific grain value of dimension coordinates satisfying a (one or more) dimension coordinate constraint of a report query to a dimensionally-modeled fact collection may also be the value, at that grain, for other dimension coordinates that do not satisfy the dimension coordinate constraint.

It is known to respond to a query to a dimensionally-modeled fact collection by reporting on the facts contained in the dimensionally-modeled fact collection. Reports are typically generated to allow one to glean information from facts that are associated with locations in a dimensional data space according to which the dimensionally-modeled fact collection is modeled.

Locations in an n-dimensional data space are specified by n-tuples of coordinates, where each member of the n-tuple corresponds to one of the n dimensions. For example, ("San Francisco", "Sep. 30, 2002") may specify a location in a two-dimensional data space, where the dimensions are LOCATION and TIME. Coordinates need not be single-grained entities. That is, coordinates of a single dimension may exist at, or be specified with respect to, various possible grains (levels of detail). In one example, a coordinate of a LOCATION dimension comprises the following grains: CONTINENT, COUNTRY, CITY.

The order of the grains may have some hierarchical significance. The grains are generally ordered such that finer grains are hierarchically "nested" inside coarser grains. Using the LOCATION dimension example, the CITY grain may be finer than the COUNTRY grain, and the COUNTRY grain may be finer than the CONTINENT grain. Where the order of the grains of a dimension has hierarchical significance, the value of a coordinate of that dimension, at a particular grain, is nominally such that the value of the coordinate of that dimension has only one value at any coarser grain for that dimension. In an example, a value of a coordinate of a LOCATION dimension may be specified at the CITY grain of the LOCATION dimension by the value "Los Angeles." This same coordinate has only one value at the COUNTRY and CONTINENT grains: "US" and "NORTH AMERICA", respectively.

SUMMARY

A method/system considers the phenomenon in which, for each of at least one of the dimension coordinates that satisfy a dimension coordinate constraint of a report query, that dimension coordinate has a particular value at a grain associated with the report query, and there are other dimension coordinates that have that particular value at the associated grain and that do not satisfy the dimension coordinate constraint. This phenomenon may occur as a result of slowly changing dimensions and other scenarios. The phenomenon is considered in the process of reporting on facts of a collection of facts organized as, or otherwise accessible according to, a dimensionally-modeled fact collection.

A received report query specifies a dimension coordinate constraint and an associated grain for the dimension coordinate constraint. At least one query is generated to the dimensionally-modeled fact collection. A result of providing the at least one query to the dimensionally-modeled fact collection is processed. The processed result includes an indication of every dimension coordinate satisfying the dimension coordinate constraint. The processed result further includes facts of the dimensionally-modeled fact collection that are specified by the every dimension coordinate satisfying the dimension coordinate constraint, as well as facts of the dimensionally-modeled fact collection that are specified by at least one other dimension coordinate that does not satisfy the dimension coordinate constraint, wherein each of the at least one other dimension coordinate has a value at the associated grain that is the same as the value at the associated grain of one of the dimension coordinates that does satisfy the dimension coordinate constraint.

BRIEF DESCRIPTION OF THE DRAWINGS

FIGS. 3A and 3B together illustrate an example of generating a report in an unfettered manner.

DETAILED DESCRIPTION

Figure 1:
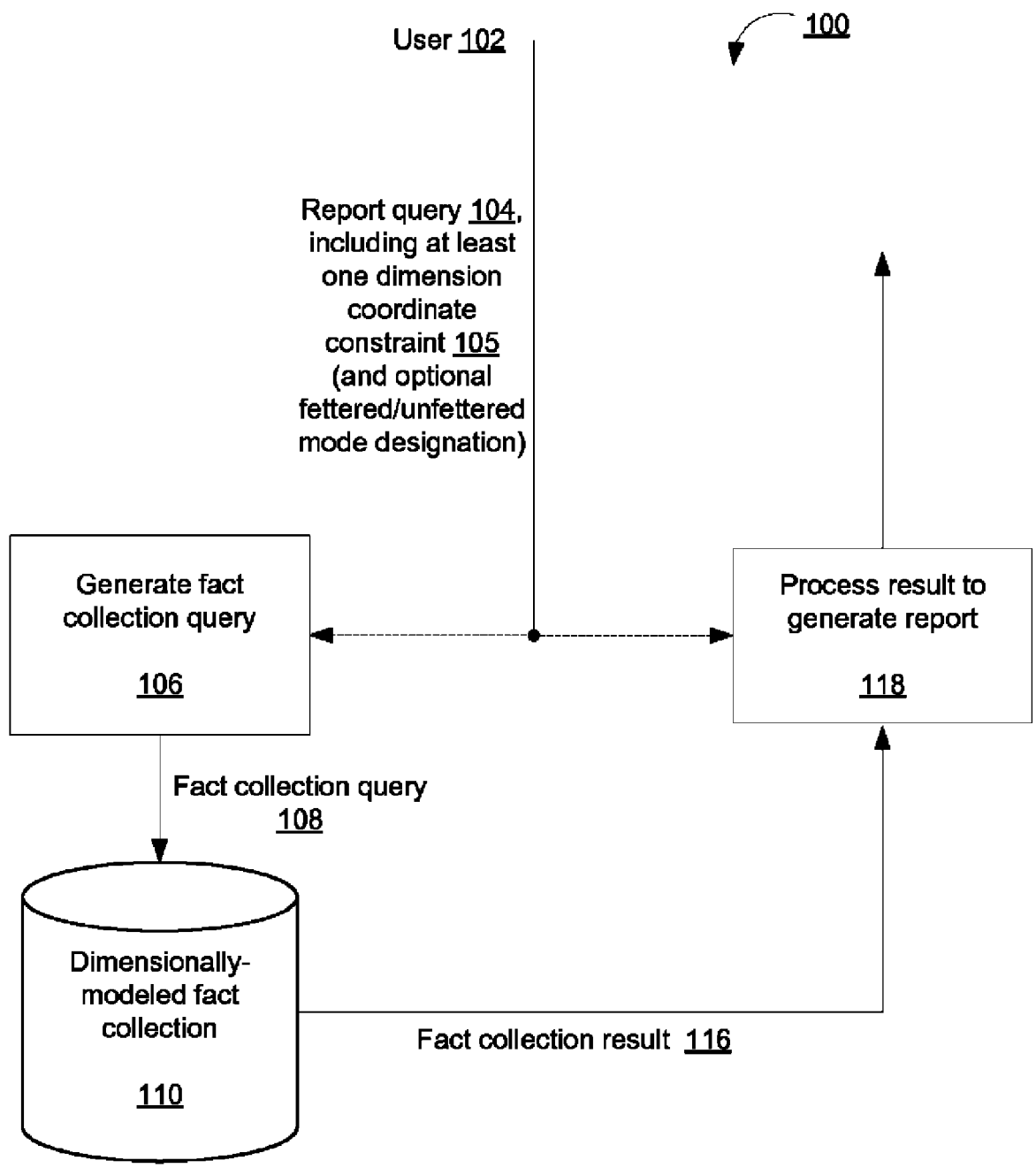
FIG. 1 is a block diagram illustrating an example architecture of a system in which reporting of facts of a dimensionally-modeled fact collection is performed in an unfettered manner.

The inventors have realized that it is desirable to consider the phenomenon in which, for each of at least one of the dimension coordinates that satisfy a dimension coordinate constraint of a report query, that dimension coordinate has a particular value at a grain associated with the report query and there are other dimension coordinates that have that particular value at the associated grain and that do not satisfy the dimension coordinate constraint. This phenomenon arises when one or more dimensions in which the dimension coordinates exist is a slowly changing dimension. In addition, there are other scenarios in which, for each of one or more of the dimension coordinates satisfying the report query, that dimension coordinate has a particular value at a grain associated with the report query and there are other dimension coordinates that have that particular value at the associated grain and that do not satisfy the dimension coordinate constraint.

We first discuss the well-known phenomenon in the field of dimensional data modeling of "slowly changing dimensions." This is a phenomenon in which the relationship of grains for a dimension may change over time. While it may be contrived to consider the concept of slowly changing dimensions with reference to the example LOCATION dimension (since, generally, the relationship of CONTINENT, COUNTRY and CITY grains will not change over time), there are other more realistic examples of this phenomenon.

As one illustration, consider an EMPLOYEE dimension that is intended to represent an organizational chart of a company. In this example, the EMPLOYEE dimension comprises the following grains: ORGANIZATION, DIVISION, TEAM and PERSON. Using this example, it can be seen that values of coordinates at various grains may change as a person moves from one team to another team (or, perhaps, a team moves from one division to another division). For example, in one month, Joe worked on the Red Team; the next month, he worked on the Blue Team. This may be modeled by one EMPLOYEE dimension coordinate having the value "Joe" at grain PERSON and the value "Red Team" at grain TEAM, plus a second EMPLOYEE dimension coordinate also having the value "Joe" and grain PERSON but the value "Blue Team" at grain TEAM. It is also possible to encode in the representation of the dimension coordinates the specific time intervals during which these grain relationships obtained.

As more background to the issue of temporal dimensions (slowly changing dimensions), we use an example relative to the EMPLOYEE dimension, mentioned above, intended to represent an organizational chart of a company. The EMPLOYEE dimension comprises the grains of ORGANIZATION, DIVISION, TEAM and PERSON. In this example, various people have moved onto and off of the Red Team. This phenomenon is modeled by EMPLOYEE dimension coordinates having value "Red Team" at grain TEAM, and having values indicative of those people at grain PERSON; these dimension members and that grain relationship are further qualified by the times during which that relationship obtained. These dimension members may be represented as follows:

TABLE 1

| value at PERSON grain | value at TEAM grain | date range for which this value at PERSON grain has the value of "Red Team" at the TEAM grain |
| --- | --- | --- |
| Joe | Red Team | 4 Jan. 2004 to 1 Mar. 2006 |
| Mary | Red Team | 3 Mar. 2003 to 18 Jul. 2006 |
| Bill | Red Team | 1 Dec. 2005 to 12 Dec. 2005 |

Continuing with the example, and noticing that Bill is only on the Red Team for part of December 2005, consider that Bill was on the Blue Team from 13 Dec. 2005 to 31 Dec. 2005. Finally, also consider that the number of calls taken during December 2005 by Joe, Mary and Bill (and Zoe as well) is represented as follows:

TABLE 2

| value at PERSON grain | value at TEAM grain | date range (during December) for "number of calls" value | number of calls taken |
| --- | --- | --- | --- |
| Joe | Red Team | 1 Dec. 2005 to 31 Dec. 2005 | 10 |
| Mary | Red Team | 1 Dec. 2005 to 31 Dec. 2005 | 22 |
| Bill | Red Team | 1 Dec. 2005 to 12 Dec. 2005 | 8 |
| Bill | Blue Team | 13 Dec. 2005 to 31 Dec. 2005 | 6 |
| Zoe | Blue Team | 1 Dec. 2005 to 31 Dec. 2005 | 12 |

Given the preceding information, a report query may request the number of calls taken during December 2005 by persons who were on the Red Team sometime during December 2005. There are some analytic scenarios in which a user may desire to know the number of calls taken by each person on the Red Team (including Bill) during December 2005 to include only those calls taken while that person was actually on the Red Team (a dimension coordinate constraint). These may be thought of as reporting on facts in a "fettered" manner, since the facts accounted for in the reported results not only correspond to the dimension coordinate constraint of persons on the Red Team but, in addition, are bound by the dimension coordinate constraint of persons on the Red Team (i.e., include facts for persons on the Red Team only while those persons are actually on the Red Team). Thus, for example, the record indicating the six calls taken by Bill while Bill was on the Blue team is not utilized for the report.

This is what would be reported conventionally. For example, using the preceding information regarding calls taken, such a report (i.e., with Bill being attributed only those calls taken during December 2005 by Bill while Bill is actually on the Red Team) may be as follows:

TABLE 3

| value at PERSON grain | December 2005 |
| --- | --- |
| Joe | 10 |
| Mary | 22 |
| Bill | 8 |

For example, using the preceding information regarding calls taken by Joe, Mary and Bill, it may be useful for a user to know the number of calls taken by each person on the Red Team during December 2005, without regard for whether that person was actually on the Red Team when the calls were taken. That is, it may be useful for the facts accounted for in the reported results, while corresponding in some sense to the dimension coordinate constraint of persons on the Red Team, to be not bound by the dimension coordinate constraint of persons on the Red Team (i.e., may include facts for persons on the Red Team even while those persons were not actually on the Red Team). Thus, for example, the record indicating the six calls taken by Bill while Bill was on the Blue team is utilized for this unfettered report.

Reporting on the facts in such an unfettered manner, Bill is attributed calls taken during December 2005 without regard for the team of which Bill is a member when a particular call is taken, and the report would be as follows:

TABLE 4

| value at PERSON grain | December 2005 |
| --- | --- |
| Joe | 10 |
| Mary | 22 |
| Bill | 14 |

Thus far, we have discussed scenarios arising due to the phenomenon of slowly changing dimensions. As mentioned above, the inventors have realized that there are other analytic scenarios in which it would be useful for the facts to be reported in an "unfettered manner" (i.e., in a manner that corresponds to, but is not strictly bound by the dimension coordinate constraint of the report query). In general, such analytic scenarios arise in situations where a grain value of dimension coordinates satisfying the dimension coordinate constraint of a report query may also be the value, at that grain, for other dimension coordinates that do not satisfy the dimension coordinate constraint of the report query.

For example, referring to Table 5 below, a dimension coordinate constraint of a report query may be with respect to weeks in the month of January (ignoring the beginning of January for simplicity of explanation).

TABLE 5

| | | |
|---|---|---|
| January | week 3 | 10 |
| January | week 4 | 22 |
| January | week 5 | 8 |
| February | week 5 | 6 |
| February | week 6 | 3 |

Thus, with reference to Table 5, a report query for calls taken during a week in January (the dimension coordinate constraint being, in informal terms, "a week in January") would result in the dimension coordinates characterized by:

"January" at the month grain and "week 3" at the week grain;

"January" at the month grain and "week 4" at the week grain; and

"January" at the month grain and "week 5" at the week grain.

However, the value of "week 5" at the week grain is also the value, at the week grain, of the dimension coordinate characterized by:

"February" at the month grain and "week 5" at the week grain.

Therefore, when reporting in a fettered manner, the reported "number of calls" in response to the report query of "calls taken during a week in January" would result in a report of 10+22+8=40 calls. On the other hand, when reporting in an unfettered manner, the reported "number of calls" in response to the same report query would result in a report of 10+22+8+6=46 calls. That is, when reporting in a fettered manner, the six calls occurring during week 5 in February would not be reported, since the portion of week 5 that is in February is not in January. On the other hand, when reporting in an unfettered manner, the six calls occurring during week 5 in February would be reported. That is, these calls are still for a dimension coordinate with "week 5" at the week grain, even though the dimension coordinate does not satisfy the report query, since the dimension coordinate has the value "February" at the month grain.

FIG. 1 is a block diagram illustrating an example architecture of a system 100 in which reporting of facts of a dimensionally-modeled fact collection is performed in an unfettered manner. Referring to FIG. 1, a user 102 may cause a report query 104 to be provided to a fact collection query generator 106. For example, the user 102 may interact with a web page via a web browser, where the web page is served by a report user interface using, for example, a Java Server Page mechanism. In this example, the user 102 interacts with the web page such that the report query 104 is provided to the fact collection query generator 106. The report query 104 includes a dimension coordinate constraint, which may be one or more dimension coordinate constraints.

In general, a dimension coordinate constraint for a dimension of the dimensionally-modeled fact collection specifies coordinates of that dimension of the dimensionally-modeled fact collection. For example, a dimension coordinate constraint may specify coordinates of that dimension of the dimensionally-modeled fact collection by specifying a value of the dimension at a particular grain. Dimension coordinate constraints of the report query 104, then, specify a subset of coordinates of one or more dimensions of the dimensionally-modeled fact collection, on which it is desired to report.

The fact collection query generator 106 processes the report query 104 to generate an appropriate corresponding fact collection query 108, which is presented to the dimensionally-modeled fact collection 110. A result 116 of presenting the fact collection query 108 to the dimensionally-modeled fact collection 110 is processed by a report generator 118 to generate a report corresponding to the report query 104 caused to be provided by the user 102. In particular, the generated report includes an indication of dimensional members as appropriate in view of the dimensional coordinate constraints of the report query 104.

In one example, the dimensionally-modeled fact collection 110 is implemented as a relational database, storing fact data in a manner that is accessible to users according to a ROLAP—Relational Online Analytical Processing—schema (fact and dimension tables). In this case, the fact collection query 108 may originate as a database query, in some form that is processed into another form, for example, which is processed by an OLAP query engine into a fact collection query 108, presented as an SQL query that is understandable by the underlying relational database. This is just one example, however, and there are many other ways of representing and accessing a dimensionally-modeled fact collection.

Processing 118 is applied to the fact collection result 116 to generate a report. The generated report includes an indication of dimension members and facts corresponding to those indicated dimension members. For example, the facts corresponding to those indicated dimension members may be reported in an "unfettered" (i.e., in a manner that is not bound by the dimension coordinate constraint of the report query) such as is discussed above relative to the example of Bill and the Red Team. The facts corresponding to those indicated dimension members may be reported in a "fettered" manner (i.e., in a manner that is bound by the dimension coordinate constraints of the report query 104).

Referring still to FIG. 1, the composition of the generated report may be accomplished by the fact collection query generator 106 particularly generating the fact collection query 108 in accordance with the report query, by the result processing 118 particularly processing the fact collection result (e.g., by applying filtering) in accordance with report query, or by a combination of both.

As also illustrated in FIG. 1, the report query 104 may include an unfettered/fettered mode designation, which may be provided, for example, via a user interface. In some examples, in the absence of such an unfettered/fettered mode designation, the manner in which the facts corresponding to those indicated dimension members are reported may be according to a default mode or according to a preconfigured mode. The fact collection query generator 106 and/or the result processing 118, as appropriate, operate according to the default, preconfigured or designated mode.

Figure 2:
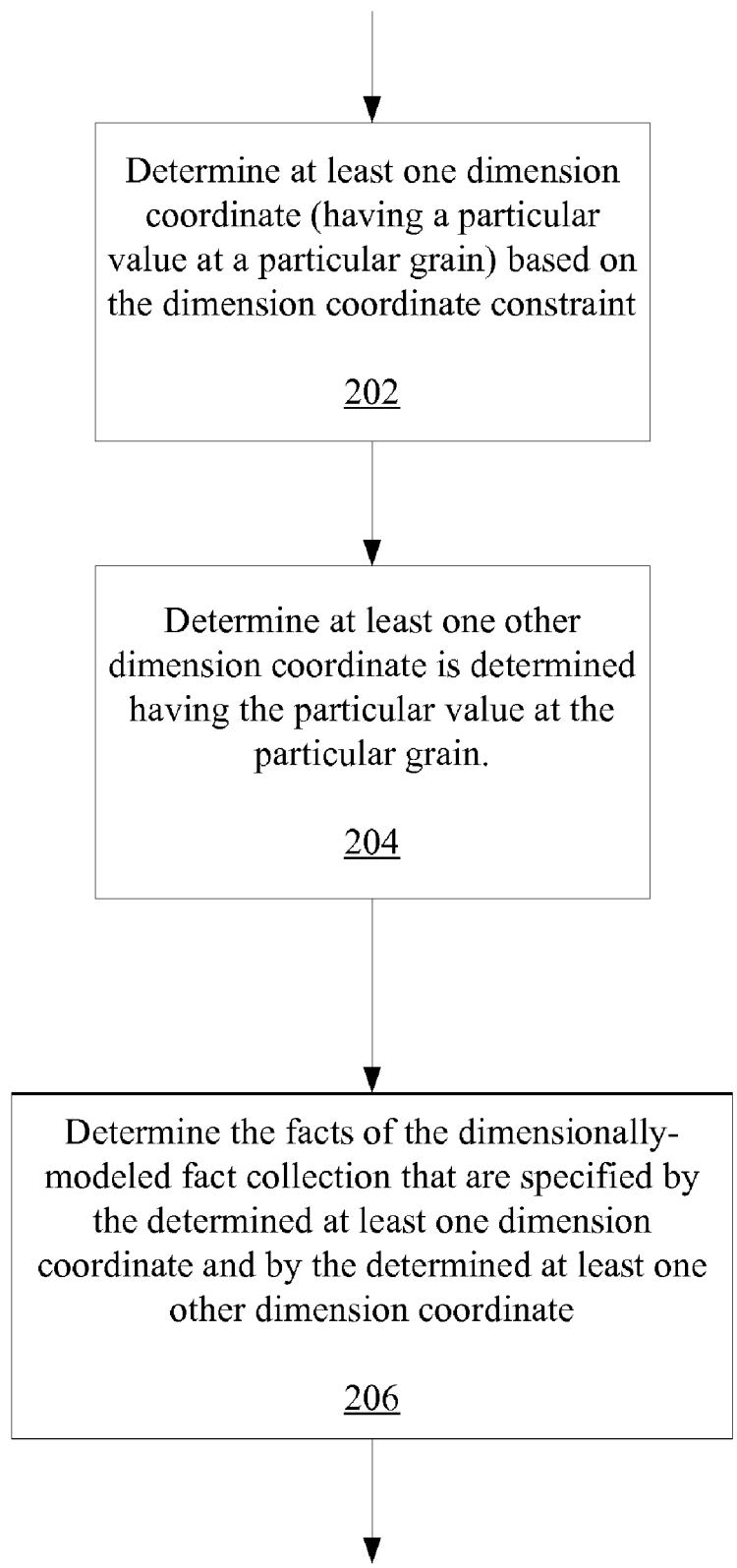
FIG. 2 is a flowchart illustrating a multiple-pass processing method.

In accordance with one example, a multiple-pass processing is utilized. An example of the multiple-pass processing is illustrated by the flowchart of FIG. 2. In a first pass 202, every dimension coordinate (which may be one or more dimension coordinates) that satisfies the dimension coordinate constraint is determined. The determined dimension coordinates have a particular value at a particular grain. In another pass 204, at least one other dimension coordinate (which may be one or more other dimension coordinates) is determined that does not satisfy the dimension coordinates constraint, wherein each of the at least one other dimension coordinates has a value at the associated grain that is the same as the value at the associated grain of one of the dimension coordinates determined in the first pass 202. In yet another pass 206, the facts of the dimensionally-modeled fact collection are determined that are specified by the determined dimension coordinates and by the determined at least one other dimension coordinate.

FIG. 3A illustrates steps of a specific example of generating a report in an unfettered manner. Corresponding FIG. 3B provides supplemental explanatory material for the FIG. 3A example. Referring to FIG. 3A, at step 302, a report query is received, and the report query includes a dimension coordinate constraint of "persons on the Blue Team." Oval 352 of FIG. 3B illustrates a formalistic representation of the dimension coordinate constraint and the associated grain. At step 304 of FIG. 3A, the received report query is processed to obtain all (one or more) dimension coordinates in which the value at the team grain is "Blue Team." Oval 354 of FIG. 3B indicates that, in the example, the obtained dimension coordinates have a value of "Joe," "Sally" or "Mista" at the Person grain (in addition to having the value of "Blue Team" at the Team grain).

At step 306, all (one or more) dimension coordinates are obtained that satisfy a replacement dimension coordinate constraint, including the grain values obtained at step 304 ("Joe," "Sally" or "Mista"), without the constraint of "person on the Blue Team." Oval 356 illustrates a formalistic representation of the step 306 dimension coordinate constraint.

At step 308, operations corresponding to the report query are performed on the facts specified by the dimension coordinates obtained at step 306. That is, as illustrated by oval 358, operations to generate the report are performed on the facts specified by all dimension coordinates for which the value at the Person grain is "Joe," "Sally" or "Mista" but for which the value at the Team grain may be, but is not necessarily, "Blue Team."

We have described herein a method/system which considers the phenomenon in which a particular value at a grain associated with a dimension coordinate constraint of a report query may also be the value, at the associated grain, for other dimension coordinates that do not satisfy the dimension coordinate constraint of the report query.

What is claimed is:

1. A method of processing a request for information associated with dimensionally modeled organizational information in which an employee dimension includes a set of grains having a relationship with each other, the request including a specification of a dimension coordinate constraint and a specification of a particular associated grain for the dimension coordinate constraint, the method comprising:
   receiving the specification of a dimension coordinate constraint that is a team constraint and the specification of a particular associated grain for the team constraint corresponding to a person grain;
   processing an indication of a fact reporting mode, the fact reporting mode being selectable by a user designation;
   generating at least one query to a dimensionally-modeled fact collection; and
   processing a result of providing the at least one query to the dimensionally-modeled fact collection,
   wherein the processed result includes an indication of every dimension coordinate satisfying the team constraint, and
   wherein the processed result further includes:
      in response to the indication of the fact reporting mode being the fettered mode, reporting fettered facts of the dimensionally-modeled fact collection, the fettered facts including an attribution for every person in a person dimension coordinate satisfying the team constraint during a time period of interest, and
      in response to the indication of the fact reporting mode indicating an unfettered mode, automatically reporting unfettered facts of the dimensionally-modeled fact collection, the unfettered facts being specified by determining, for every person in the person dimension coordinate satisfying the team constraint, an attribution unbounded by the team constraint during the time period of interest; and
   returning the processed result in response to the request;
   the unfettered facts providing an additional type of selectable attribution information for the returned processed result that is not strictly bound by the team constraint to account for a situation in which one or more employees transition between teams over the time period of interest.

2. The method of claim 1, wherein the attribution for each person in the person dimension satisfying the dimension coordinate constraint corresponds to the number of contacts handled within the time period of interest.

3. The method of claim 1, wherein the unfettered facts are generated in a second pass of processing by utilizing the indication of every person in the person dimension coordinate satisfying the team constraint and then analyzing, for each person in the set, the cumulative attribution of each person in the time period of interest regardless of team membership.

4. The method of claim 1, wherein returning the processed result comprises:
   reporting the processed result, wherein the report includes an indication of each person that satisfies the team constraint in the time period of interest and further includes facts for each person on the team in the time period of interest indicating the attribution of each person on the team.

5. The method of claim 4, wherein for the unfettered mode the facts are reported in an unfettered manner in which for a person on the team that also belonged to at least one other team during the time period of interest the unfettered facts includes for that person the cumulative attribution for all teams that the person was a member of during the time period of interest.

6. The method of claim 1, wherein the attribution for each person in the person dimension satisfying the dimension coordinate constraint corresponds to the number of calls handled within the time period of interest.

7. The method of claim 1, further comprising:
   receiving the indication of the fact reporting mode via a user interface.

8. A method of attributing credit for contacts handled within an organization having dimensionally modeled employee organizational information including dimension coordinates and associated grains by processing a request including a specification of a dimension coordinate constraint defining a team in the organization chart and a specification of a person grain for the team constraint, to a dimensionally-modeled fact collection, the method comprising:
   receiving a specification of the team constraint and a specification of a person grain for the team constraint;
   processing an indication of a fact reporting mode, the fact reporting mode being selectable by a user designation;
   generating at least one query to the dimensionally-modeled fact collection; and
   processing a result of providing the at least one query to the dimensionally-modeled fact collection and returning a report,
   wherein the report includes an indication of every person in a person dimension coordinate satisfying the team constraint, and
   wherein the processed result further includes:
      fettered facts of the dimensionally-modeled fact collection, the fettered facts being specified for every person in a person dimension coordinate satisfying the team constraint while a member of the team during a time period of interest to attribute the number of communication contacts handled by each member of the time while they are members of a team satisfying the team constraint during the time period of interest, and in response to the indication of the fact reporting mode indicating an unfettered mode, automatically including unfettered facts of the dimensionally-modeled fact collection, the unfettered facts being specified by determining, for every person in the person dimension coordinate satisfying the team constraint, facts unbounded by the team constraint to attribute the total number of communication contacts handled by each person that is a member of the team for any portion of the time period of interest; and returning the processed result in response to the request;

the unfettered facts providing an additional type of selectable information for the returned processed result that is not strictly bound by the team constraint to account for a situation in which one or more individual persons transition between teams over the time period of interest.

9. The method of claim 8, wherein the unfettered facts are generated in a second pass of processing by utilizing the indication of every person in the person dimension coordinate satisfying the team constraint and then analyzing, for each person in the set, the cumulative attribution of each person in the time period of interest regardless of team membership.

10. The method of claim 8, further comprising:

receiving the indication of the fact reporting mode via a user interface.

11. A method of processing a request for information associated with an organizational chart having an employee dimension and associated grains by providing a request including a specification of a dimension coordinate constraint that is a team constraint and a specification of a particular associated grain corresponding to a person grain, to a dimensionally-modeled fact collection, the method comprising:

receiving the specification of the team constraint and the specification of the person grain for the team constraint;

processing an indication of a fact reporting mode selectable by a user designation, wherein the fact reporting mode is one of a fettered mode and an unfettered mode;

generating at least one query to the dimensionally-modeled fact collection;

processing a result of providing the at least one query to the dimensionally-modeled fact collection, and processing the indicated fact reporting mode;

wherein in a first pass of processing the processed result includes:

an indication of every dimension member at the person level satisfying the team constraint, wherein for the fettered mode facts reporting facts attributed to each dimension member that is a member of a team satisfying the team constraint during a time period of interest; and wherein for the unfettered mode, performing a second pass of processing for each dimension member determined in the first pass of processing, the second pass of processing and reporting facts attributed to each respective dimension member unbounded by the team constraint;

the unfettered facts providing an additional type of selectable information for the returned processed result that is not strictly bound by the team constraint to account for a situation in which at least one person is related to more than one team over a time period of interest.

12. The method of claim 11, wherein the facts include the number of contacts handled during the time period of interest.

13. The method of claim 12, wherein in the fettered mode a report is generated providing a listing of the persons belonging to the team during the time period of interest and the number of contacts handled by each person only while they are a member of the team.

14. The method of claim 13, wherein the unfettered mode a report is generated providing a listing of the persons belonging to the team during the time period of interest and the cumulative number of contacts handled by each person including any calls handled while on another team for a portion of the time period of interest.

15. The method of claim 11, wherein the facts include the number of calls handled during the time period of interest.

16. A method of processing a request for information to attribute factual information handled within an organization having dimensionally modeled organizational information in which an employee dimension includes a set of grains having a relationship with each other, the request including a specification of a dimension coordinate constraint and a specification of a particular associated grain for the dimension coordinate constraint, to a dimensionally-modeled fact collection, the method comprising:

receiving the specification of a dimension coordinate constraint and the specification of an associated grain;

processing an indication of a fact reporting mode, the fact reporting mode being selectable by a user designation;

generating at least one query to the dimensionally-modeled fact collection; and processing a result of providing the at least one query to the dimensionally-modeled fact collection, wherein the processed result includes an indication of dimension coordinate satisfying the team constraint, and wherein the processed result further includes:

fettered facts of the dimensionally-modeled fact collection, the fettered facts including a fact attribution for every dimension in the dimension coordinate constraint satisfying the dimension coordinate constraint during a time period of interest, and in response to the indication of the fact reporting mode indicating an unfettered mode, automatically including unfettered facts of the dimensionally-modeled fact collection, the unfettered fact attribution being specified by determining for every dimension value satisfying the dimension coordinate constraint, attribution information unbounded by the dimension coordinate constraint during the time period of interest; and returning the processed result in response to the request;

the unfettered facts providing an additional type of selectable attribution for the returned processed result that is not strictly bound by the dimension coordinate constraint to account for a situation in which the grain relationships change during the time period of interest.

17. The method of claim 16, wherein the employee dimension includes at least a division grain, a team grain, and a person grain further wherein the dimension coordinate constraint is a division constraint and at least one team moves from one division to another during the time period of interest.

18. The method of claim 16, wherein the fact attribution includes a number of contacts handled during the time period of interest.

19. The method of claim 16, wherein fact attribution includes a number of calls handled during the time period of interest.

20. The method of claim 16, wherein the employee dimension includes at least a team grain and a person grain, further wherein the dimension coordinate constraint is a team constraint and at least one individual person transitions between teams during the time period of interest.

21. The method of claim 20, wherein the fact attribution includes a number of contacts handled during the time period of interest.

22. The method of claim 20, wherein fact attribution includes a number of calls handled during the time period of interest.

\* \* \* \* \*